US006886595B2

United States Patent
James et al.

(10) Patent No.: US 6,886,595 B2
(45) Date of Patent: May 3, 2005

(54) BI-DIRECTIONAL ADJUSTABLE ENERGY DISSIPATING AND HEAD LOSS VALVE

(75) Inventors: Bruce James, Oakville (CA); Amzad Ali, Surrey (CA)

(73) Assignee: Stealth International, Inc., Ontario (CA)

( * ) Notice: Subject to any disclaimer, the term of this patent is extended or adjusted under 35 U.S.C. 154(b) by 224 days.

(21) Appl. No.: 10/263,735

(22) Filed: Oct. 4, 2002

(65) Prior Publication Data

US 2004/0065372 A1 Apr. 8, 2004

(51) Int. Cl.$^7$ ............................................. F16K 3/316
(52) U.S. Cl. .................................. 137/625.33; 251/282
(58) Field of Search ..................... 137/625.33; 251/282, 251/326

(56) References Cited

U.S. PATENT DOCUMENTS

| | | | | |
|---|---|---|---|---|
| 2,601,231 A | * | 6/1952 | Smith et al. | 137/625.33 |
| 3,312,241 A | * | 4/1967 | Bryant | 137/625.33 |
| 3,923,285 A | * | 12/1975 | Diehl et al. | 251/200 |
| 3,955,591 A | * | 5/1976 | Baumann | 137/625.33 |
| 4,150,693 A | | 4/1979 | Genevey et al. | |
| 4,230,299 A | * | 10/1980 | Pierce, Jr. | 251/14 |
| 4,972,878 A | * | 11/1990 | Carlin | 137/625.33 |

* cited by examiner

Primary Examiner—John Fox
(74) Attorney, Agent, or Firm—Ogilvy Renault; Paul J. Field

(57) ABSTRACT

A bi-directional head loss valve with a valve body having a flow path along a flow axis and a transverse valve actuation axis, an actuation shaft housing and a guide shaft mount disposed in opposition along the transverse valve actuation axis. A fixed plate is housed within the valve body transverse the flow axis, with downstream orifices parallel to the flow axis and a mobile plate is housed within the valve body upstream of and parallel to the fixed plate, with upstream orifices parallel to the flow axis. The mobile plate is adapted to move along the transverse valve actuation axis: from a fully open position, wherein the upstream and downstream orifices are in flow communication; to a fully closed position, wherein the downstream orifices are blocked by the mobile plate. An actuation shaft along the transverse actuation axis is slidably housed within the actuation shaft housing, and has an inner end engaging the mobile plate and an outer end adapted to engage a valve actuator. A guide shaft along the transverse actuation axis has an inner end engaging the mobile plate and an outer end engaging the guide shaft mount. The guide shaft supports and guides the mobile plate during reverse flow and transient conditions.

10 Claims, 2 Drawing Sheets

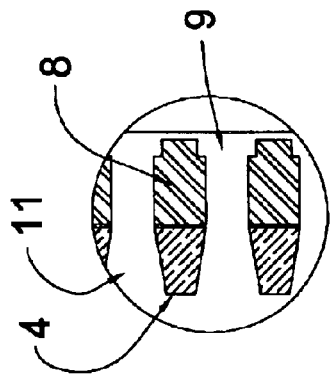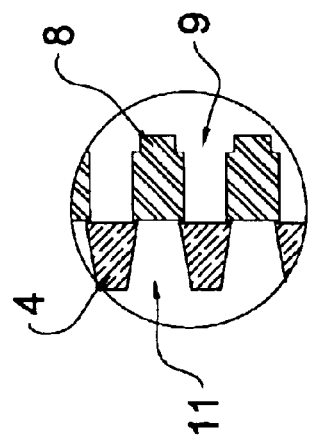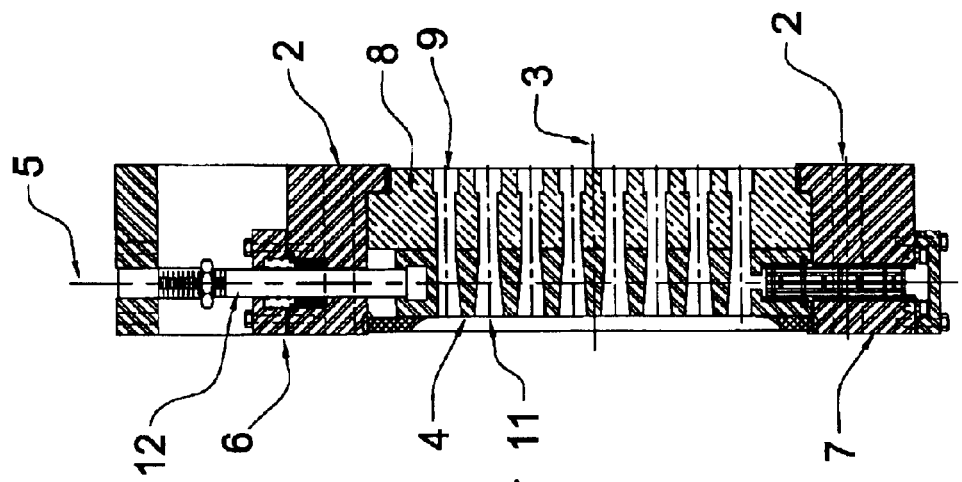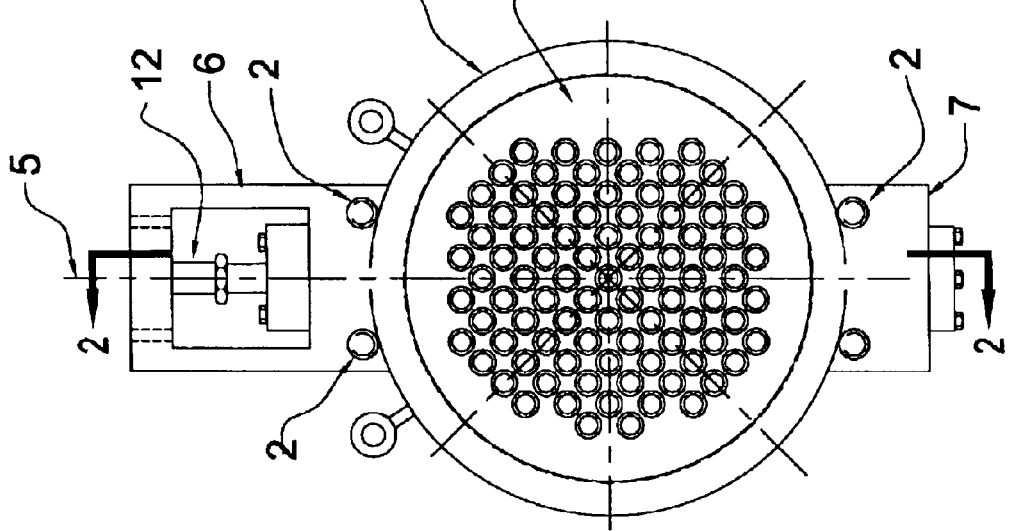

US 6,886,595 B2

BI-DIRECTIONAL ADJUSTABLE ENERGY DISSIPATING AND HEAD LOSS VALVE

TECHNICAL FIELD

The invention relates to a bi-directional head loss valve with mobile plate supported during reverse flow and transient conditions with a guide shaft in addition to the valve actuation shaft.

BACKGROUND OF THE ART

The invention relates to valves for placement in liquid flow pipelines known as adjustable energy dissipating or head loss valves. The valves include an adjustable or movable plate and a fixed plate clamped within the valve body between an upstream and downstream flange in the pipe of various fixed diameters. A simple annular valve body permits clamping of the valve between pipe flanges with axially extending bolts. The downstream plate is fixed or stationary and perforated with a pattern of axial holes. The upstream plate is likewise perforated and is retained within the annular valve body for transverse sliding motion between a fully opened position where perforations in the fixed and mobile plates are aligned and fully closed position where the perforations within the fixed plate are blocked by the solid portions of the mobile plate.

An example of prior art loss of head valve is shown in U.S. Pat. No. 4,150,693 to Genevey et al. In this prior art valve, the mobile perforated plate is moved between the open and closed position with a manual hand wheel whose rotation meshes with a threaded rod that engages the mobile plate to open and close the valve. The mobile plate is guided in its movement by a stud opposite to the threaded rod, which slides in a slot.

A disadvantage of such prior art valves is that reverse flow or transient flow conditions acting on the mobile plate can dislodge it from its operating position causing damage, misalignment or disabling of the valve. In addition, the mobile plate may vibrate creating noise and potential wear or damage over the long term during bi-directional flow conditions.

It is an object of the invention to provide improved guidance and support for the mobile plate during operation to prevent misalignment, damage or noise during reversal of flow or bi-directional transient flow conditions.

Further objects of the invention will be apparent from review of the disclosure, drawings and description of the invention below.

DISCLOSURE OF THE INVENTION

The invention provides a bi-directional head loss valve with a valve body having a flow path along a flow axis and a transverse valve actuation axis, an actuation shaft housing and a guide shaft mount disposed in opposition along the transverse valve actuation axis. A fixed plate is housed within the valve body transverse the flow axis, with downstream orifices parallel to the flow axis and a mobile plate is housed within the valve body upstream of and parallel to the fixed plate, with upstream orifices parallel to the flow axis. The mobile plate is adapted to move along the transverse valve actuation axis: from a fully open position, wherein the upstream and downstream orifices are in flow communication; to a fully closed position, wherein the downstream orifices are blocked by the mobile plate. An actuation shaft along the transverse actuation axis is slidably housed within the actuation shaft housing, and has an inner end engaging the mobile plate and an outer end adapted to engage a valve actuator. A guide shaft along the transverse actuation axis has an inner end engaging the mobile plate and an outer end engaging the guide shaft mount. The guide shaft supports the mobile plate during reverse flow and transient conditions.

DESCRIPTION OF THE DRAWINGS

In order that the invention may be readily understood, one embodiment of the invention is illustrated by way of example in the accompanying drawings.

FIG. 1 is transverse view of the valve showing the face of the mobile plate within the valve body with the actuation shaft on the upper portion of the body and guide shaft mount in a lower portion.

FIG. 2 is a longitudinal vertical cross-sectional view along lines 2—2 of FIG. 1 showing the internal arrangement of mobile plate and fixed plate with actuation shaft and guide shaft.

FIG. 3 is a detailed view of the perforations within the mobile plate and fixed plate in their open or aligned position in flow communication.

FIG. 4 is a like view showing the fully closed position where the mobile plate has been moved upwardly by the actuation shaft.

Figure 5:
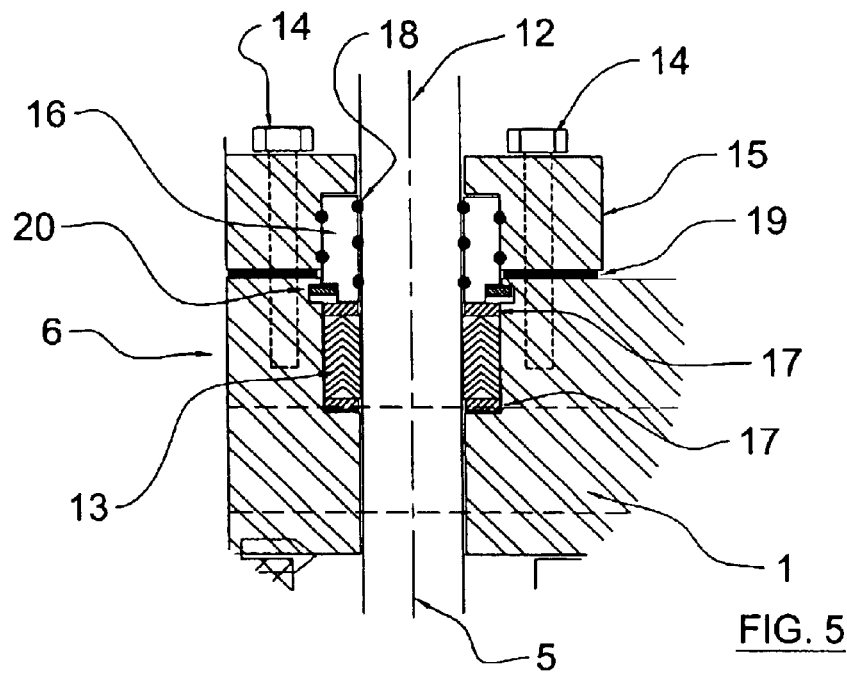
FIG. 5 is a detailed vertical cross-sectional view through the actuation shaft housing showing the sealing packing arrangement.

Further details of the invention and its advantages will be apparent from the detailed description included below.

DETAILED DESCRIPTION OF PREFERRED EMBODIMENTS

FIG. 1 shows a transverse elevation view of the bi-directional head loss valve according to the invention whereas FIG. 2 shows an axial cross-sectional view along line 2—2. The generally annular valve body 1 has parallel upstream and downstream faces for bolting between the flanges of a pipe using threaded bolts through bolt holes 2.

The valve body 1 defines an axial flow path of generally circular cross-section centred along a flow axis 3. The mobile plate 4 slides within the valve body 1 along the transverse valve actuation axis 5. In the top portion of the valve body 1, as illustrated, is an actuation shaft housing 6 and disposed in opposition along the transverse valve actuation axis 5 is a guide shaft mount 7.

Figure 6:
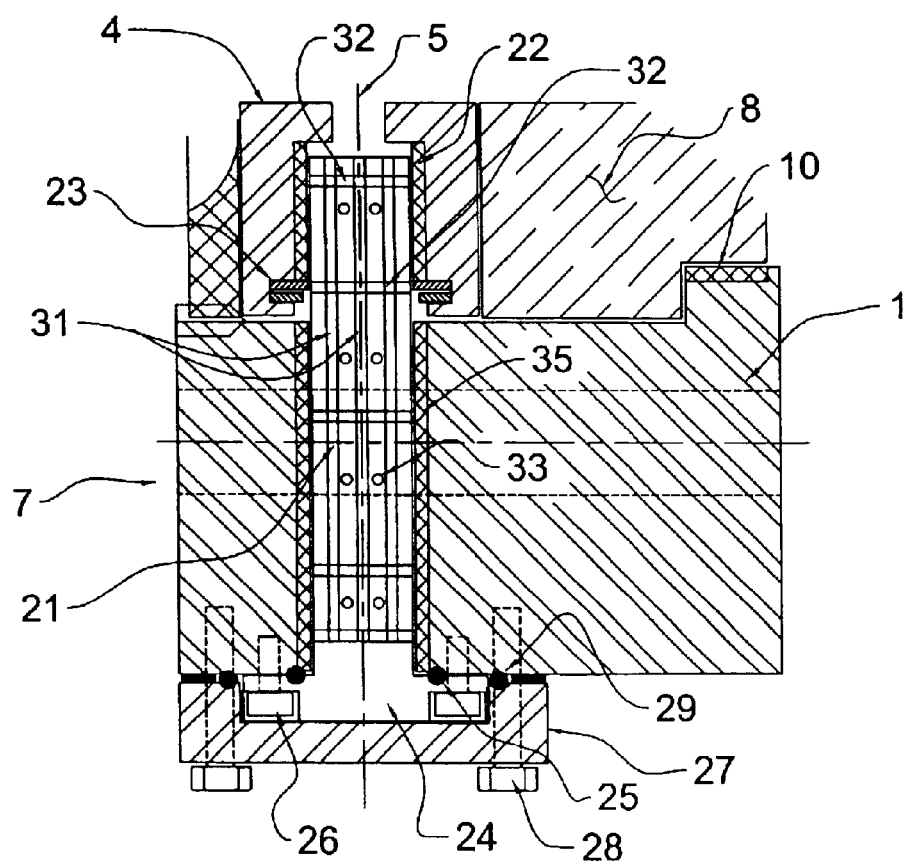
FIG. 6 is a transverse cross-sectional view through the guide shaft mount and guide shaft which supports the bottom portion of the mobile plate during vertical motion between the open and closed position.

The fixed plate 8 is mounted within the valve body 1 transverse to the flow axis 3 and includes a large number of downstream orifices 9 that are parallel to the flow axis 3 as best seen in FIG. 6. The fixed plate 8 is isolated from the valve body 1 with an anti-corrosion ring 10 to ease the removal of the fixed plate 8 during maintenance or inspection. The anti-corrosion ring 10 and other bearings which will be described in detail may be of the self-lubricating woven fabric type sold under the trade-mark DURALON™ which includes woven TEFLON™ fabric liners backed by filament wound fibreglass and epoxy resins, or other non metallic materials.

The mobile plate 4 is also housed within the valve body 1 upstream of and parallel to the fixed plate 8. The mobile plate 4 includes an equal number of upstream orifices 11 that are parallel to the flow axis 3. The mobile plate 4 is adapted to move along the transverse valve actuation axis 5 from a fully open position as shown in FIG. 2 and FIG. 3 where the upstream orifices 11 and the downstream orifices 9 are in flow communication and to move to a fully closed position as shown in FIG. 4 where the downstream orifices 9 are blocked by the solid portions of the mobile plate 4.

The actuation shaft 12 is disposed along the transverse actuation axis 5 and slidably housed within the actuation shaft housing 6 sealed with chevron shaped annular packing 13, as best seen in FIG. 5. Bolts 14 secure an annular collar 15 that compresses the packing 13 via sleeve 16 and containment rings 17. O-rings 18 seal between the sleeve 16, the actuation shaft 12 and the collar 15 whereas a gasket 19 seals between the valve body 1 and the collar 15.

An advantage of this arrangement is that O-rings 18 and sleeves 16 as well as collar 15 and gasket 19 can be removed for inspection and maintenance while the valve remains in service. The fluid pressure forces the packing 13 upwardly thereby engaging split ring 20 and containment ring 17. The chevron shape of the packing 13 flexes to maintain a seal with the actuation shaft 12 during such maintenance operation.

The actuation shaft has an inner end that engages the mobile plate 4 and an outer end that is adapted to engage a valve actuator (not shown) with a threaded outer end surface for example. Conventional manual wheels or electrically powered valve actuators can be utilized in a conventional manner.

FIG. 6 shows details of the guide shaft mount 7 for housing the guide shaft 21 along the transverse actuation axis 5. An inner end of the guide shaft 21 engages the mobile plate 4 whereas the outer end of the guide shaft 21 engages the guide shaft mount 7 of the valve body 1. In the preferred embodiment illustrated in the drawings the guide shaft 21 slidably engages the mobile plate 4. Cylindrical DURAL-ONG™ bearings 22 reduce friction, isolate different materials from corrosive activity and maintain alignment. The cylindrical bearing 22 is retained between the mobile plate 4 with removable split rings 23. However, it will be apparent to those skilled in the art that the guide shaft 21 could equally be fixed to the mobile plate 4 and slide within the guide shaft mount 7.

Preferably the guide shaft 21 includes an external head 24 sealed to an external surface of the valve body 1 with O-rings 25 and bolts 26. In this embodiment, the guide shaft 21 can extend through the valve body 1 and is easily removed for maintenance purposes. Further, it is preferable to ensure sealing of the valve body 1 with a seal end cap 27 also secured to the external surface of the valve body 1 with bolts 28 and O-ring 29 covering the external head 24 of the guide shaft 21. An isolating sleeve 30 about the guide shaft 21 isolates the guide shaft 21 from the valve body 1 and ensures that corrosion does not lock the guide shaft 21 within the valve body 1. The sleeve 30 is also a DUR-ALON™ bearing preferably.

In order to prevent undesirable hydraulic locking of the mobile plate 4 or in high pressure situations to avoid lifting of the mobile plate 4 under pressure, pressure equalization channels (31, 32, 33) are provided in communication with the flow path in at least one of the guide shafts 21, the mobile plate 4 or the guide shaft mount 7.

In the preferred embodiment shown, the pressure equalization channels include three examples. The first example comprises longitudinal grooves 31 creating splines longitudinally within the exterior surface of the guide shaft 21. Further examples of pressure equalization channels include the radial grooves 32 and bores 33 through the guide shaft 21. Other configurations of pressure equalization channels may include helical grooves (not shown) or other combinations of grooves and bores. The function of the grooves 31 and 32 and the bores 33 is to enable free fluid flow around the guide shaft 21 thereby ensuring that high or low relative pressure zones or negative pressure zones do not occur around the guide shaft 21 or mobile plate 4 that would create undesirable movement of the mobile plate 4 or create hydraulic locking thus impeding operation of the valve.

Although the above description relates to a specific preferred embodiment as presently contemplated by the inventor, it will be understood that the invention in its broad aspect includes mechanical and functional equivalents of the elements described herein.

We claim:

1. A bi-directional head loss valve comprising:
   a valve body having a flow path along a flow axis and a transverse valve actuation axis, the body including an actuation shaft housing and a guide shaft mount disposed in opposition along the transverse valve actuation axis;
   a fixed plate within the valve body transverse the flow axis, the fixed plate having a plurality of downstream orifices parallel to the flow axis;
   a mobile plate housed within the valve body upstream of and parallel to the fixed plate, the mobile plate having a plurality of upstream orifices parallel to the flow axis, the mobile plate being adapted to move along the transverse valve actuation axis: from a fully open position, wherein the upstream and downstream orifices are in flow communication; to a fully closed position, wherein the downstream orifices are blocked by the mobile plate;
   an actuation shaft along the transverse actuation axis slidably housed within the actuation shaft housing, the actuation shaft having an inner end engaging the mobile plate and an outer end adapted to engage a valve actuator; and
   a guide shaft along the transverse actuation axis having an inner end engaging the mobile plate and an outer end engaging the guide shaft mount;
   wherein at least one of: the guide shaft; the mobile plate; and the guide shaft mount, include pressure equalization channels in communication with the flow path.

2. A bi-directional head loss valve according to claim 1 wherein the pressure equalization channels comprise grooves in an external surface of the guide shaft.

3. A bi-directional head loss valve according to claim 2 wherein the grooves have an orientation selected from the group consisting of: longitudinal; radial; and helical.

4. A bi-directional head loss valve according to claim 1 wherein the pressure equalization channels comprise bores through the guide shaft.

5. A bi-directional head loss valve according to claim 1 wherein the guide shaft slidably engages the mobile plate.

6. A bi-directional head loss valve according to claim 5 wherein the guide shaft extends through the valve body, the guide shaft including an external head sealed to an external surface of the valve body.

7. A bi-directional head loss valve according to claim 6 wherein the external head of the guide shaft is secured to the valve body with bolts and is sealed with an O-ring.

8. A bi-directional head loss valve according to claim 7 comprising a sealed end cap secured to the external surface of the valve body covering the external head of the guide shaft.

9. A bi-directional head loss valve according to claim 1 comprising a slide bearing about the guide shaft.

10. A bi-directional head loss valve according to claim 1 comprising an isolating sleeve about the guide shaft.

* * * * *